United States Patent [19]

Argazzi et al.

[11] 4,347,806
[45] Sep. 7, 1982

[54] LIQUID DISPENSING APPARATUS

[75] Inventors: Dennis J. Argazzi; Robert Burger, both of Newington, Conn.

[73] Assignee: Loctite Corporation, Newington, Conn.

[21] Appl. No.: 202,418

[22] Filed: Oct. 30, 1980

[51] Int. Cl.³ ............................................... B05C 5/02
[52] U.S. Cl. ..................................... 118/710; 118/410
[58] Field of Search ............... 118/319, 211, 230, 232, 118/710, DIG. 3, DIG. 11, 410, 500, 411, 416; 222/309; 285/335

[56] References Cited

U.S. PATENT DOCUMENTS

| 1,809,813 | 6/1931 | Kantor | |
|---|---|---|---|
| 2,345,534 | 3/1944 | Grim | 118/410 |
| 2,677,835 | 5/1954 | Kamborian | 118/211 |
| 3,420,208 | 1/1969 | Guthrie | 118/2 |
| 4,119,058 | 10/1978 | Schmermund | 118/411 |
| 4,128,009 | 12/1978 | D'Autry | 73/425.6 |
| 4,263,348 | 4/1981 | Renegar | 118/411 |

Primary Examiner—Ralph S. Kendall
Attorney, Agent, or Firm—Watson, Cole, Grindle & Watson

[57] ABSTRACT

An apparatus for applying a liquid product to a workpiece includes a pump piston and cylinder unit for pumping the product through a valved outlet orifice, displacement of the piston being adjustable for controlling the amount of product dispensed, the piston being pneumatically operated, and a rotatable turret being mounted on the unit and having a plurality of seats for holding workpieces of different sizes. Liquid product passageways extend from the seats toward the outlet orifice, and one of such passageways communicates with the orifice in a selected rotative position of the turret.

8 Claims, 5 Drawing Figures

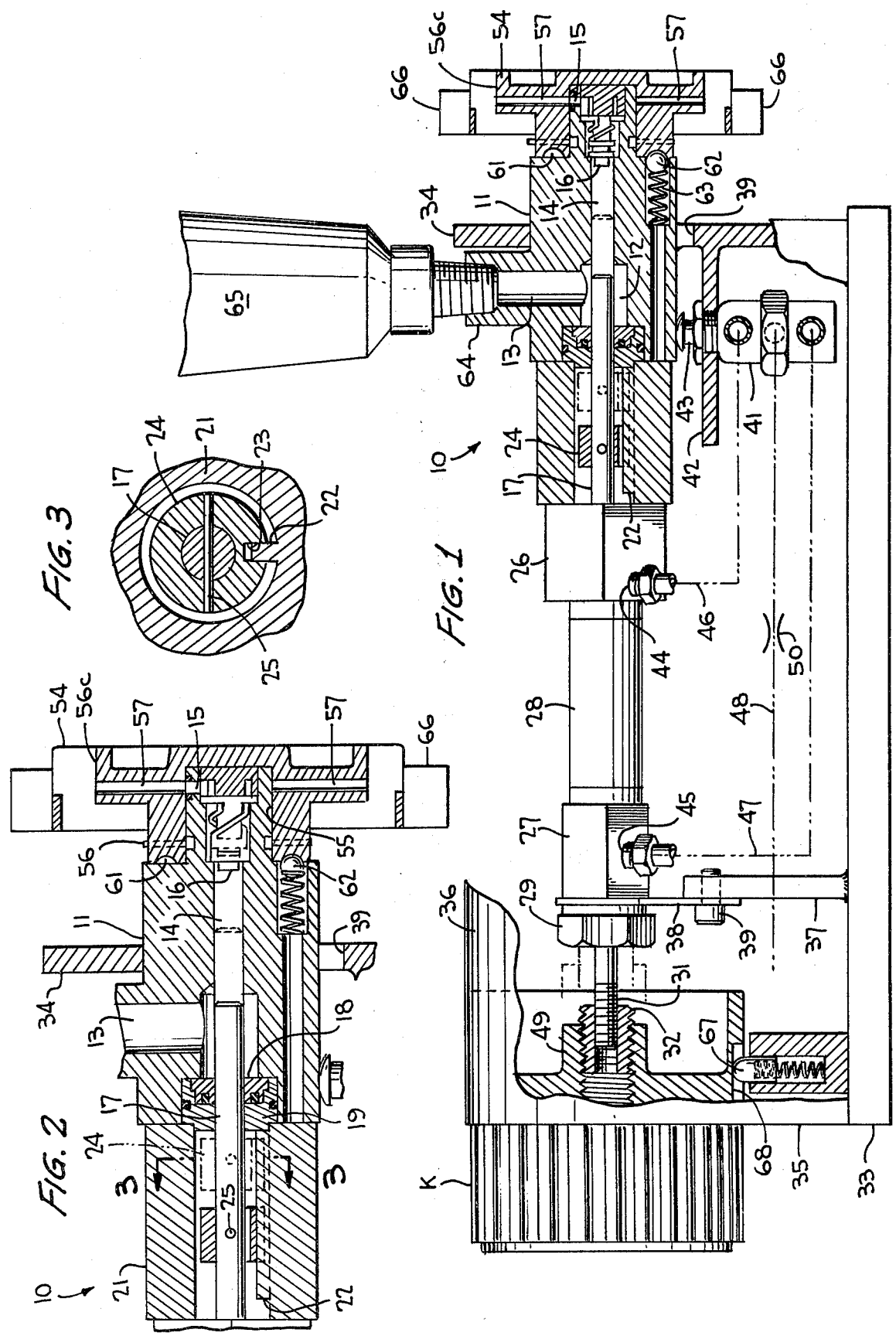

LIQUID DISPENSING APPARATUS

BACKGROUND OF THE INVENTION

This invention relates generally to a liquid dispenser, and more particularly to a piston-type positive displacement applicator capable of dispensing high viscosity sealants, for example, in repeatable and controlled quantities to facilitate the coating, for example, of workpieces such as threaded pipe fittings.

Sealants, especially of the high viscosity type, are oftentimes difficult to dispense in an accurate and controlled manner particularly when coating cylindrical workpieces. It is desirable to coat, for example, the threads of pipe fittings only with optimum amounts of sealant during repeatable applications of the same or differently sized fittings. Excessive amounts are wasteful and give a sloppy appearance while insufficient amounts could affect the sealing quality. Moreover, the dispensing should be carried out quickly without compromising on accuracy.

SUMMARY OF THE INVENTION

It is therefore an object of this invention to provide an apparatus for dispensing a liquid product, especially a highly viscous sealant, for the coating of workpieces in a rapid, efficient and controllable manner.

Another object is to provide such an apparatus as a piston-type positive displacement applicator capable of dispensing the liquid product in repeatable and accurate quantitites.

A further object of the present invention is to provide such an apparatus as including a workpiece holder in the form of a turret to facilitate accurate placement of the sealant on a threaded workpiece. Displacement of the piston is adjustable for controlling the amount of product to be dispensed, and the turret may have a plurality of workpiece seats each with a product passageway extending toward the outlet orifice of the apparatus, and one of such passageways communicating with such orifice in a selected rotative position of the turret. Dispensing of an appropriate amount of sealant for a given fitting size, is thus assured.

A still further object of this invention is to provide such an apparatus wherein piston displacement is adjusted by means of a rotatable knob threaded on to an end of the piston for movement therewith, the piston extending through an end cap which provides a limit stop for the forward travel of the piston.

A still further object of the invention is to provide such an apparatus which is hingedly supported in a frame, and wherein the piston is actuated by a pneumatic control means which includes a push button bearing against the apparatus and being depressible for effecting the dispensing upon manual depression of the apparatus.

Other objects, advantages and novel features of the invention will become more apparent from the following detailed description of the invention when taken in conjunction with the accompanying drawings.

BRIEF DESCRIPTION OF THE DRAWINGS

FIG. 1 is a side elevational view, partly in section, of the sealant dispensing apparatus according to the invention;

FIG. 2 is a slightly enlarged sectional view of a forward portion of the FIG. 1 apparatus;

FIG. 3 is a cross-sectional view, slightly enlarged, taken substantially along lines 3—3 of FIG. 2;

DETAILED DESCRIPTION OF THE INVENTION

Figure 4:
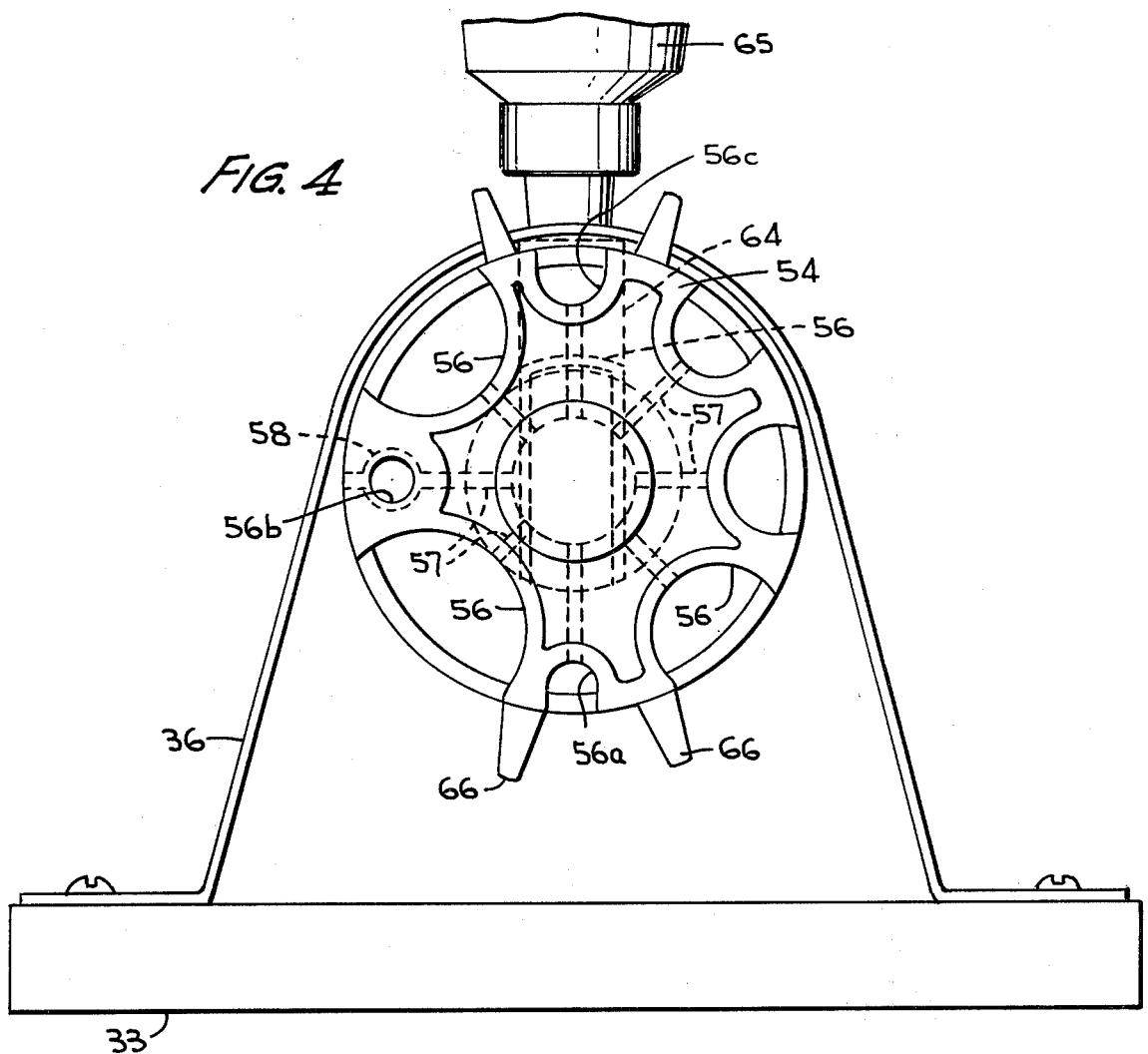
FIG. 4 is an enlarged end elevational view of the FIG. 1 apparatus.

Turning now to the drawings, wherein like reference characters refer to like and corresponding parts throughout the several views, the applicator or dispenser according to the invention is shown in FIGS. 1 and 2 as comprising a piston and cylinder unit 10 which includes a housing 11 containing a cavity 12 having a product inlet bore 13, and a pump cylinder defined by a bore 14 extending from the cavity and terminating in a radially extending valve controlled outlet orifice 15. This outlet orifice is shown closed in FIGS. 1 and 2 by a spring biased one-way valve 16 (in solid outline) of any standard variety. A piston, in the form of an elongated rod member 17, is shown in its retracted position in FIGS. 1 and 2 in solid outline, and in phantom in an extended position partially projecting into bore 14. As more clearly shown in FIG. 2, the piston rod extends rearwardly through a seal ring 18 and an O-ring 19 which are mounted within housing 11. The piston rod further extends rearwardly through the central opening of a support element 21 which is mounted in any normal manner to the rearward face of housing 11. A tongue 22 on element 21 (see also FIG. 2) extends into a groove 23 provided in a collar 24 secured to the piston rod by a dowel pin 25. The piston is thus free to move between its extended and retracted positions, but it is restrained against turning movement about its central axis.

The piston extends rearwardly through connector elements 26, 27 (FIG. 1) located at opposite ends and is part of an air cylinder 28, connector element 26 being mounted to the rearward face of support element 21 in any normal manner. The piston further extends rearwardly outwardly through an end cap 29 on element 27 and terminates in a threaded end 31. A threaded sleeve 32 engages this end and, after assembly, is securely bonded thereto.

The aforedescribed applicator is mounted on a frame comprising a base plate 33 having vertically extending forward and rearward walls 34, 35, and a cover plate 36 (see also FIG. 4) covering the apparatus. A support element 37 extends upwardly from the base plate for supporting the rearward portion of the applicator as by means of flat spring plate 38 depending from element 27 and secured to support 37 as at 39. Forward wall 34 has an opening 39 through which housing 11 extends, this opening being oversized to a gap at the lower end of the housing to facilitate downward movement of the entire applicator about spring plate 38 which functions as a resilient hinge.

A four-way valve 41 is mounted on a flange 42 extending from the forward wall of the frame, and a pushbutton 43 extends outwardly of the valve and bears against the bottom of housing 11. A pair of spaced piston heads (not shown) on the piston rod are located in air cylinder 28, and pressurized air ports 44, 45 are disposed relative to the piston heads as in any normal manner in an air pump operated by a four-way valve assembly. Air pressure lines 46, 47 respectively interconnect ports 44, 45 with the four-way valve, and an air tube 48, which may have an air flow restrictor 50, extends into the valve from a conventional compressed air source (not shown). Thus, inward depression of the pushbutton, as housing 11 is manually moved in a direction functions to admit pressurized air into air line 47 for extending the piston while at the same time exhausting pressurized air through line 46 for retracting the piston rod while air is exhausted through line 47. Operation of such a four-way valve together with the air cylinder is well known in the art and therefore need not be described in further detail.

Figure 5:
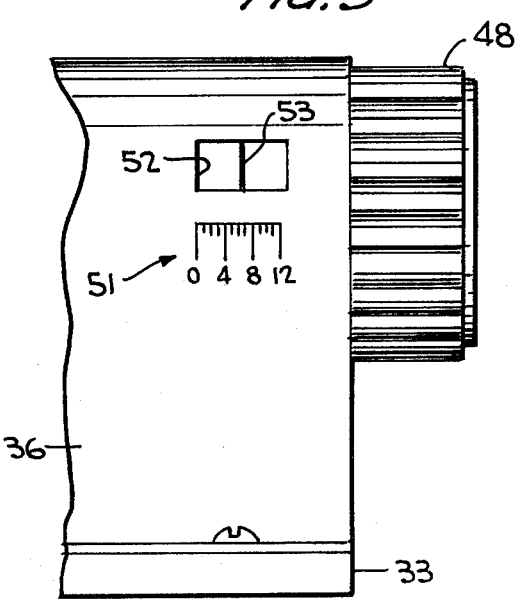
FIG. 5 is a side elevational view of the piston displacement adjusting knob and the indicia provided on the cover of the apparatus for gauging the amount of product to be dispensed.

In order to adjust the displacement or stroke of piston 17, a rotatable knob K extends partially outwardly of wall 35 and has a central internally threaded collar 49 engaging the threads of sleeve 32. Thus, in the solid outline position of collar 49, the piston 17 and collar 24, in FIG. 1, extended movement of the piston is limited to the distance between the outer end sleeve 32 and the outer face of end cap 29 (which essentially comprises an end wall of the housing) as the knob moves forwardly with the piston when extended. Thus, by increasing the threaded engagement between the knob and sleeve 32, the spacing between collar 49 (or sleeve 32) and end cap 29 will be decreased, so that piston displacement will be accordingly decreased and less product will be dispensed through the valve controlled outlet orifice. Precise amounts of dispensed sealant may be gauged by the provision of a feed knob adjustment scale 51 (see FIG. 5) applied to the outer surface of cover plate 36 adjacent a window opening 52 in the cover plate for exposing the outer surface of knob K. A circumferential line 53 may be provided on the outer surface of the knob for alignment with one of the scale numbers during axial shifting movement of the knob for determining an appropriate feed knob adjustment relative to the amount of the sealant to be dispensed for a given fitting diameter. Example, a feed knob adjustment of 0.5 to 1.0 may be set for applying an accurate and controlled amount of sealant to the threads of a 1/16 inch NPT fitting diameter. And a setting of 2.5 to 3.5 may be set for a fitting diameter of ¾ inch NPT.

Means for holding a cylindrical workpiece during the sealant dispensing operation, is provided for the present apparatus in the form of a turret 54 having a central cavity 55 to facilitate the mounting of the turret on the reduced end portion of housing 11. The turret is mounted for free rotation thereon about the central axis of the piston, and is retained in place by a spring clip 56. As more clearly shown in FIG. 4, the turret is provided with a plurality of seats 56 circumferentially spaced along its periphery, the seats being of different radius for accommodating workpieces having correspondingly sized radii. And, each of the seats is provided with a radially extending open passageway 57 extending between the inner end of the seat and intersecting through cavity 55. It should be pointed out that the smallest seat 56a is duplicated as at 56b except that the latter is completely closed and has an inwardly open groove 58 extending therearound in communication with its passageway 57.

The turret is provided with spherical depressions 61 associated with each of its seats for the reception, in a given rotative position of the turret, of a ball detent 62 which is resiliently urged outwardly of the housing by a spring 63. Discharge orifice 15 likewise extends radially outwardly of the end of housing 11 in a selected rotative position of the turret which is maintained in such position by the cooperation between ball 62 and its depression 61.

Inlet bore 13 may be defined by an internally threaded sleeve 64 extending upwardly of the housing for engagement with the nozzle end of a sealant supply tube 65. Such a tube may have a collapsible wall, or may comprise a rigid supply bottle having some type of container vent thereon to prevent air lock during the dispensing operation.

The turret is provided with a plurality of radially extending arms 66 to facilitate rotation thereof into a selected position. Thus, assuming that seat 56c is sized to accommodate a workpiece of ⅛ inch NPT diameter, the operator rotates the turret into its FIG. 4 position whereupon its passageway 57 is axially aligned with discharge orifice 15, as shown in FIGS. 1 and 2. The operator then rotates knob 48 until its indicating line 53 is aligned with an appropriate number on scale 51 which corresponds to a legend (not shown) of a range of feed knob adjustment settings (for example, 0.5 to 1.5) for dispensing an accurate and controlled amount of sealant for a workpiece having a ⅛ NPT diameter. With the piston in its retracted position, as shown in solid outline in FIGS. 1 and 2, it will extend upon actuation a distance corresponding to the distance between the outer end of sleeve 32 and the outer face of cap 29 (or between the outer end of collar 49 and the cap face) when the collar is appropriately threaded over sleeve 32. The knob is retained in its preset position by a detent 67 extending into one of several axial grooves 68 provided on the periphery of the knob, the grooves permitting the knob to travel with the piston without obstruction. The operator then places the workpiece to be coated in seat 56c and simply depresses the turret vertically downwardly to thereby depress pushbutton 43 which causes the piston to extend under air pressure from its position shown in solid outline in FIGS. 1 and 2 to its position as shown in phantom outline to thereby compress the sealant already in bore 14 which forces valve 16 to its open position (shown in phantom) and dispenses a predetermined amount of sealant through aligned orifice 15 and passageway 57 on to the outer surface of the workpiece. During or after the dispensing operation, the operator may simply rotate the workpiece by hand while maintaining it in seat 56c so as to insure an even coating. Then, as the operator releases the downward pressure applied against the turret, the apparatus springs back to its position of FIG. 1 under the assistance of plate spring 38 and permits the push button to resume its outwardly extended position. The piston is thus caused to retract back to its solid outline position thereby creating a slight negative pressure within bore 14 and cavity 12 which suctions additional sealant from tube 65 into the housing. The operation may then be repeated as often as necessary for the coating of additional workpieces accommodated by seat 56c. Otherwise, the turret may be rotated to another selective rotative position to accommodate the coating of the differently sized workpiece in which case the knob is then adjusted in accordance with such workpiece diameter.

From the foregoing it can be seen that a simple and inexpensive yet highly effective applicator has been developed, of the positive displacement piston-type, capable of dispensing a liquid product such as a high viscosity sealant in repeatable and controllable quantities to assure the dispensing of appropriate amounts of sealant for a given workpiece size.

Obviously, many modifications and variations of the present invention are made possible in the light of the above teachings. For example, the apparatus is not limited to the dispensing of sealants, and workpieces other than the type described can be coated without departing from the invention. It is therefore to be understood that within the scope of the appended claims the invention may be practiced otherwise than as specifically described.

What is claimed is:

1. An apparatus for dispensing a liquid product for the coating of a workpiece, comprising, a housing having a cavity with a product inlet, a pump cylinder extending from said cavity and terminating in a valve controlled outlet, a piston shiftable between retracted and extended positions in said housing for pumping the product from said cylinder through said outlet means for actuating said piston, and a turret mounted on said housing for rotation about a horizontal axis and including a plurality of workpiece receiving seats for each receiving a workpiece of a different size, and said turret further including a plurality of product passageways respectively extending from said seats toward said outlet, one of said passageway communicating with said outlet in a predetermined rotative position of said turret.

2. The apparatus according to claim 1, wherein means on said piston are provided for adjusting the displacement thereof to control the amount of product to be dispensed.

3. The apparatus according to claim 2, wherein said housing has an end wall and an end of said piston extends through said wall, said adjusting means comprising a knob mounted on said piston for movement therewith at a distance from said end wall, said knob being adjustable toward and away from said end wall for varying said distance and thus the length of the piston stroke.

4. The apparatus according to claim 3, wherein indicia means are provided for indicating the adjusted position of said knob.

5. The apparatus according to claim 3, further including a frame supporting said housing for pivotal movement about an axis perpendicular to the central axis of said piston, and said actuating means comprising a pneumatic control arrangement including a pushbutton in contact with said housing for activating said arrangement to shift said piston upon manual depression of said pushbutton.

6. An apparatus for dispensing a liquid product for the coating of a workpiece, comprising a frame a housing hingedly mounted on said frame and having a pump cylinder and a valve controlled outlet orifice extending from said cylinder, a piston operating in said cylinder between extended and retracted positions for pumping liquid product through said orifice, means engaging said piston for adjusting the displacement thereof to thereby control the amount of liquid product to be dispensed through said outlet, pneumatic operating means for actuating said piston including a pushbutton bearing against said housing for effecting movement of said piston upon manual movement of said housing to depress said pushbutton, and means on said housing having at least one seat for holding the workpiece, said holding means further having at least one liquid product passageway extending between said seat and said outlet orifice.

7. The apparatus according to claim 6, wherein means engage said piston for restraining movement thereof about the central axis of said piston, one end of said piston extending outwardly of an end wall of said housing, said piston displacement adjusting means comprising a knob engaging said piston end for axial movement with said piston, said end wall providing a limit stop for the extended position of said piston, said knob being adjustable on said piston end toward and away from said wall.

8. An apparatus for dispensing a liquid product for the coating of a workpiece, comprising, a housing having a pump cylinder and a valve controlled outlet orifice extending from said cylinder, a piston operating in said cylinder between extended and retracted positions for pumping liquid product through said orifice, means engaging said piston for adjusting the displacement thereof to thereby control the amount of liquid product to be dispensed through said outlet, means for actuating said piston, and a turret mounted on said housing for rotation about an axis parallel to the control axis of said piston, said turret having a plurality of seats for each holding a workpiece of a different size and further having liquid product passageways extending from said seats toward said outlet orifice, one of said passageways communicating with said outlet orifice in a selected rotative position of said turret.

* * * * *